Figure 4:
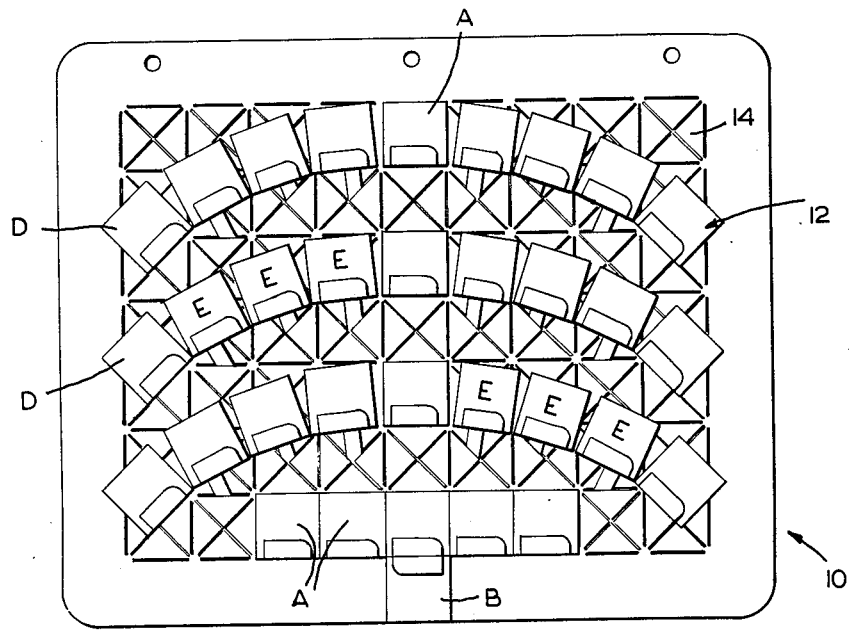

May 26, 1964  C. E. COATS  3,134,185
CHANGEABLE CHART DEVICES
Filed April 11, 1961  3 Sheets-Sheet 1
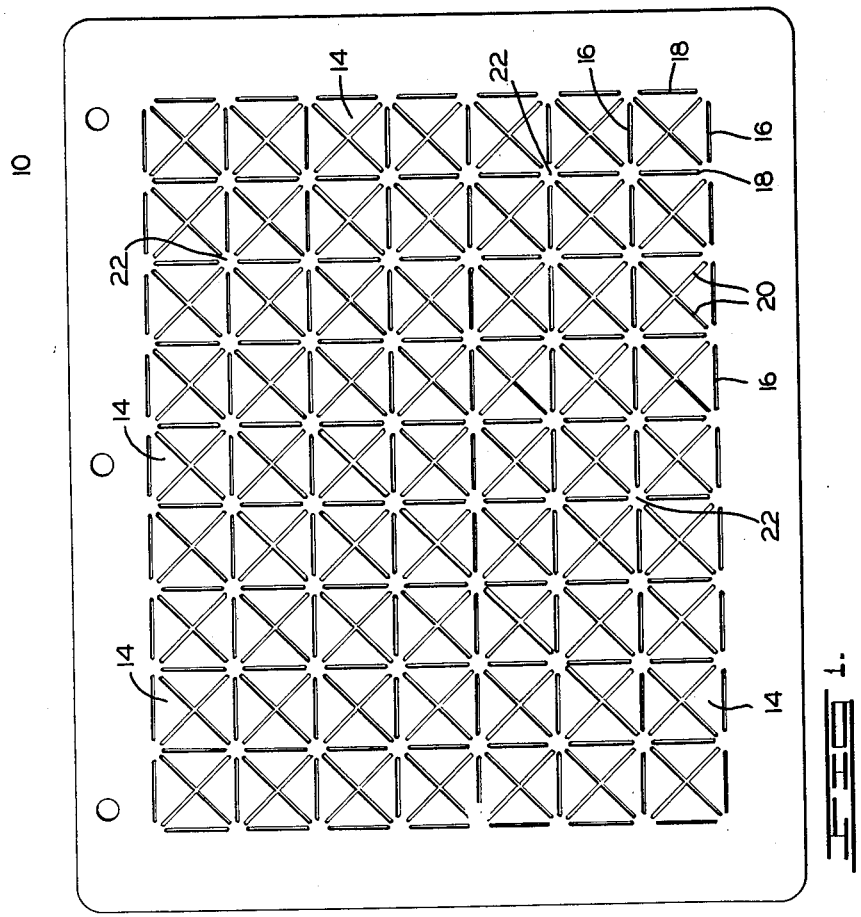
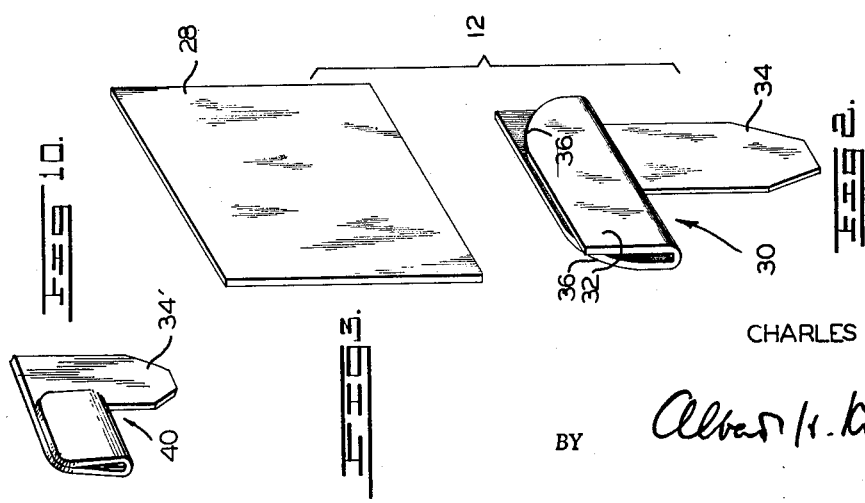
INVENTOR
CHARLES E. COATS
BY *Albert H. Kirchner*
ATTORNEY May 26, 1964  C. E. COATS  3,134,185
CHANGEABLE CHART DEVICES
Filed April 11, 1961  3 Sheets-Sheet 2

INVENTOR
CHARLES E. COATS
BY *Albert H. Kirchner*
ATTORNEY

May 26, 1964 C. E. COATS 3,134,185
CHANGEABLE CHART DEVICES
Filed April 11, 1961 3 Sheets-Sheet 3
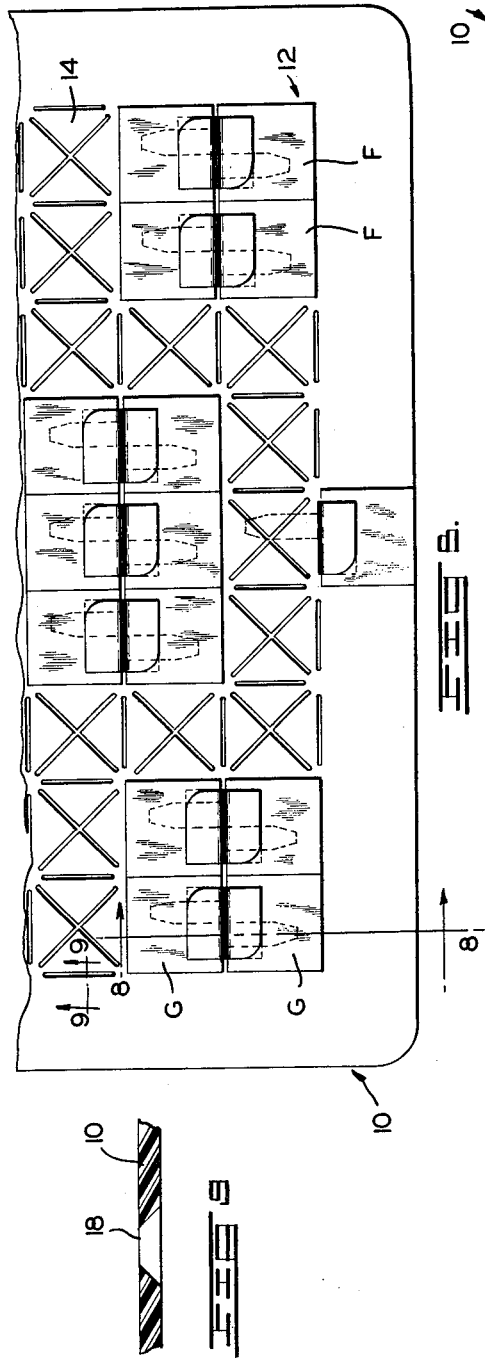
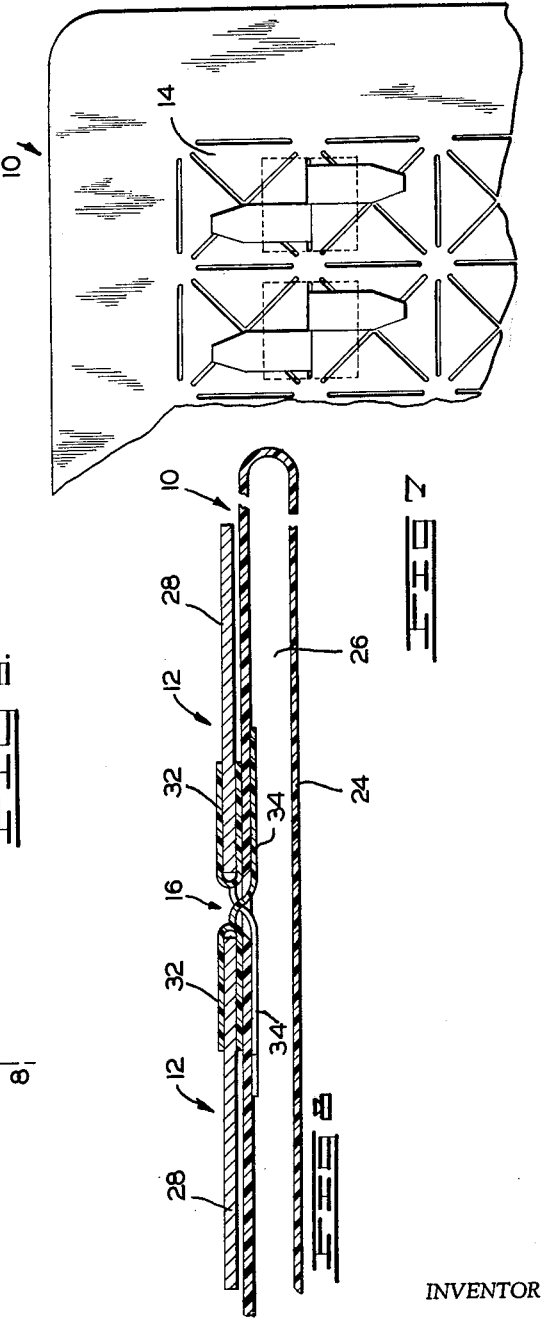
INVENTOR
CHARLES E COATS
BY *Albert H. Kirchner*
ATTORNEY

United States Patent Office 3,134,185
Patented May 26, 1964

3,134,185
CHANGEABLE CHART DEVICES
Charles E. Coats, 106 E. Sherman St., Lynn, Ind.
Filed Apr. 11, 1961, Ser. No. 102,173
1 Claim. (Cl. 40—63)

The present invention relates to changeable chart devices and more particularly to an instrumentality providing a surface on which a plurality of indicia-bearing elements are adapted to be interchangeably mounted in any of a number of different arrangements, placements and relationships so as correctly to depict, in the manner of a chart or map, any of a great variety of objective groupings of persons or things that are subject to changes in detail.

The device provided by the invention is particularly but not exclusively intended for use in connection with seating arrangements of pupils in classrooms for the purpose of providing the teacher or other appropriate person in interest with a graphic designation of the location assigned to each pupil, so as to indicate the name, for example, of the occupant of each seat or the seat which should be occupied by each pupil.

A particular object of the invention is to provide a chart device of the character indicated which will be adaptable to a number of different seat placement patterns, i.e., which can be used with a more or less standard rectangular arrangement of seats in straight lengthwise and transverse rows, or with rows set in arcuate parallelism, in complete or partial circularity, in diagonal lines or other even more informal manners such as are currently in vogue in many kindergartens and lower primary school grades, as well as in seminar sessions as sometimes held in library reading rooms, lounges and the like in institutions of the college and university level.

A principal purpose of the invention is to provide a chart which can readily be kept up to date by removal of the names of pupils who leave the class and addition of the names of new pupils, as well as by change in the seat location of any pupil, so that the teacher, and particularly a new teacher or a temporary substitute, or one who has only infrequent occasion to deal with the class, will be advised at a glance the names (or indeed the names and other pertinent data, if desired) of each of the pupils present, or at least the names, etc., of the pupils who should be occupying the respective seats.

A related object is to provide a device of the character indicated which will be inexpensive to produce, convenient to use and maintain, durable in construction, and efficient in the performance of its intended functions.

A further object is to provide a changeable exhibitor device adapted for uses analogous to the foregoing suggested classroom purposes, i.e., wherever it may be desirable to indicate the location, or the proper or assigned placement, of any of a number of persons or objects which at times may be present or absent, or whose relative positions may be subject to change. Thus the device may be used to advantage in connection with the location of exhibits in a museum, booths at an exhibition, art works in a gallery, machines in a factory, plantings in a garden, merchandise in a store, goods in a warehouse, etc., etc., as will be evident, it is believed, from the following description of a preferred embodiment of the invention.

In this embodiment, which is illustrated in the accompanying drawings, the invention is shown in a form that has been used with satisfaction in charting the placement of pupils in classrooms, as will now be explained in detail.

Figure 5:
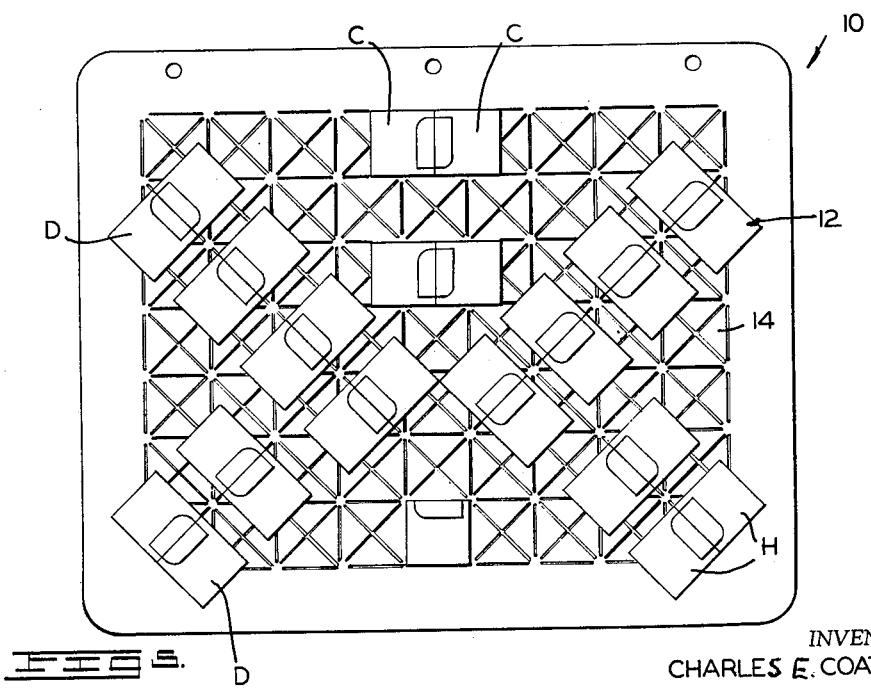

In these drawings,
FIGURE 1 is a plan surface view of the base board of the device;
FIG. 2 is a perspective view of the card holder portion of one form of indicia-bearing element that in use of the invention is mounted on the base board;
FIG. 3 is a perspective view of the card portion of one of the indicia-bearing elements;
FIG. 4 is a plan surface view of the base board showing a complete set of indicia-bearing elements mounted in place according to a particular arrangement pattern;
FIG. 5 is a similar view of the same board and set of elements showing the elements mounted in place according to a different arrangement pattern;
FIG. 6 is a detail view of the same board showing some of the elements of the set arranged in still another arrangement pattern;
FIG. 7 is a detail plan view of the back surface of the board showing four of the indicia-bearing elements in place;
FIG. 8 is a relatively enlarged sectional view taken on the line 8—8 of FIG. 6;
FIG. 9 is a still further enlarged sectional view taken on the line 9—9 of FIG. 6; and
FIG. 10 is a perspective view of another form of card holder.

In these figures the reference numeral 10 designates generally the board member of the combination, and 12 designates each of the indicia-bearing elements (see FIGS. 2 and 3). The board may be formed of heavy cardboard or equivalent stiff sheet material, but is preferably made of stout plastic where greater durability is desired at little added cost. The operative surface of the board is shown in FIG. 1 and, as there shown, is configured with a plurality of individual square areas, each designated 14, and all arranged in a rectangular pattern. As shown, in the exemplary embodiment of the invention the board is divided into 63 areas 14, comprising several horizontal rows of nine areas each. This has been found adequate for the great majority of schoolroom uses, but of course the figure is not critical and boards of greater or smaller numbers of areas 14 are fully within the spirit of the invention.

Each of the areas 14 is defined by two parallel horizontal or transverse slits 16 and two parallel vertical slits 18, and the central portion of each of the areas is configured with two diagonal, mutually bisecting slits 20. These reference numerals are shown particularly in the lower righthand portion of FIG. 1, and it will be understood that the design is repetitive over the entire working surface of the board, between the upper and lower and side margins, as shown in FIG. 1.

The transverse slits 16 of laterally contiguous areas 14 are aligned and separated by unslit spacings, and the vertical slits 18 of vertically contiguous areas 14 are likewise aligned and separated by unslit spacings. Similiarly, the diagonal slits 20 are aligned and separated from each other at the corners of the squares comprising the areas 14. This arrangement provides small spots 22 of unslit board material at each of the four corners of each of the areas 14, so that the integrity of the board is preserved and no part of the board material is cut out or inordinately weakened.

A desirable type of slit is shown in the enlarged detail view of FIG. 9, and is there seen to comprise an undercutting or internal beveling of the board material. While the view shown in FIG. 9 is one of the vertical slits 18, it will be understood that the specific bevel is identical in all the slits 16, 18 and 20 of the preferred embodiment of the invention. This is for the purpose of readily accommodating the indicia-bearing elements as will be hereinafter explained.

The slits all extend completely through the board 10, and the entire back of the board is closed by a backing or closure sheet 24. As shown in FIG. 8, this sheet may be integral with the board, being folded back from one edge of the board into parallelism with the board and forming therewith a two-ply laminated structure. If the board and the backing sheet are integral, the three free edges of the two may be secured together but are preferably left unconnected. If the board and sheet are made of separate pieces, the two are properly bonded together, preferably alone one edge only. Such arrangements provide access to the back of the board, to assist in adjusting the card holders later to be described, and if the board and backing sheet are of relatively stiff material, as is preferred, they can be spread apart and the device stood on a table in the manner of an easel. In any even, the entire central areas of the two, behind all of the areas 14 of the board, are unconnected, thus leaving a space 26 shown in exaggerated width in FIG. 8, intervening between the board and the sheet. Actually in most embodiments of the invention the board and sheet are in substantial contact throughout most of their opposed surfaces, but are separable to provide some spacing 26 to accommodate entry of the tongues or prongs of the indicia-bearing elements 12, as will now be described.

Each of the indicia-bearing elements 12 comprises a card 28 and a card holder, which may be of the form shown at 30 in FIG. 3. The card is simply a small square piece of cardboard, heavy paper or other stiff sheet material capable of being written upon. The holder is best made of stiff transparent plastic which in the form shown in FIG. 3 is molded to shape so as to provide an upper generally channel portion 32 and a lower prong member 34 depending from the base of the channel. The lips of the channel portion are engaged with each other, thus closing the channel and keeping it closed by the inherent resilience of the material, but allowing it to be opened for entry of a card 28 to be seated in the bottom of the channel. The card is preferably somewhat wider than the channel and is necessarily considerably higher than the depth of the channel, so that when the card is seated in place and firmly gripped by the lips of the channel, the major portion of its area will protrude above the lips.

To facilitate entry of a card into the holder the lips of channel are best trimmed or cut away, as by being beveled or rounded off at one end only of each, with each rounded off end, designated 36 in FIG. 3, opposite the unrounded off end of the opposite lip. By this expedient the lips are readily sprung apart by pressure of the corner of a card against one of the unrounded off corners of a lip exposed by the rounded off end of the opposite lip.

The prong 34 is best made about twice as long as the depth of the channel and appreciably less than half as wide as the channel length. It may be bluntly pointed at its free end, and it extends asymmetrically from the channel, i.e., nearer to one end of the slot than to the other. The precise degree by which the prong is off-center of the slot is best shown in FIG. 6, from which it will be perceived that the inner edge of the prong lies substantially accurately along the transverse center line of the channel. This relationship is important in attaining one of the desirable objectives of the preferred embodiment of the invention, as will hereinafter appear.

In use of the chart device, as for example in mapping, as it were, the placement of pupils in a classroom, the name (and if desired other data as well) of each pupil is written on one of the cards 28, and each card is inserted in one of the card holders 30. Each of the card and card holder assemblies is then mounted on the board 10 in a position corresponding to the location appointed for the corresponding pupil in the classroom. The mounting is effectuated by inserting the prongs 34 of the assemblies through the slits 16, 18 and/or 20 of the board so as to seat the bottoms of the channels of the holders down on, or close to, the slits, with the prongs disposed in the space 26 between the board and the backing sheet 24, as indicated in the enlarged scale view of FIG. 8. As has been stated, the space 26 is exaggerated in that view, for the sake of clarity of illustration. Actually the sheet 24 engages the prongs and assists in frictionally holding them, and the channels and the cards, sufficiently firmly in position to prevent accidental displacement.

It will be recognized, particularly from a comparison of FIGS. 4, 5 and 6, that the card holders are insertible in any of the slits 16, 18 and 20. It will be noted also that the off-center prongs of the holders can be positioned centrally of the slits, or at either side of center, so that:

(1) A card 28 can be mounted centrally of an area 14 so as to cover the area, as shown at A in FIG. 4, or cover an adjacent area of the margin of the board, as shown at B in FIG. 4, by inserting the prong 34 through one of the transverse slits 16, in either of which cases the card is disposed in upright position; or (2) A card can be mounted sidewise, so as to project laterally from its holder, by inserting the prong into one of the vertical slits 18, as shown at C, C in FIG. 5; or (3) A card can be mounted so as to be disposed diagonally of the board, as shown at D, D in FIGS. 4 and 5, by inserting the prong through one of the diagonal slits 20; or (4) A card can be mounted so as to be disposed at an oblique angle, relative to the board's top and side edges, greater or less than the 45° angle of cards D, by inserting the prong through any of the slits 16, 18 or 20 and projecting the holder to less than full seating position in the slit, as shown at E, E in FIG. 4; and (5) A pair of cards can be mounted close together, in sidewise engagement as shown at F, F in FIG. 6, or in endwise engagement as shown at G, G in FIG. 6, and that this same edge-contacting relationship can be obtained in cards mounted in the diagonal slits as shown at H, H in FIG. 5, all by proper relative placement of the off-center prongs in the slits.

Thus the holders cooperate with the slits to make the device sufficiently versatile to reproduce substantially any arrangement of seating (or other objective situation to be depicted). FIGS. 4, 5 and 6 show seats arranged along straight lines in vertical, horizontal and/or diagonal rows, and along curved or arcuate lines, and in various groupings of two seats together (FIG. 5) or four seats together (FIG. 6). It will be recognized that these views show only a few of the possible arrangements.

It will be recognized that because the cards are readily removable from their frictional grip mounting in the holders, it is unnecessary to discard and replace a card when the mounting position is altered, as from vertical to horizontal or vice versa. The data on a card mounted in vertical or horizontal placement can always be exhibited in upright position by simply removing the card from the holder and turning it ninety degrees and reinserting it. Cards mounted in diagonal position will necessarily show their data at an oblique angle to the top and sides of the board, but these cards too can be removed and reinserted to advantage whenever a change is made between such positions as are shown at D, D, in the upper and lower lefthand corners of FIG. 5.

The alternative form of card holder shown at 40 in FIG. 10 can be die cut from a sheet of thermoplastic material and bent to the shape shown in the figure. It will be appreciated that this holder has the advantage of low cost, as compared with the molded holder of FIG. 2, accompanied by some disadvantage because the base of the channel, in which the card is to be seated, is necessarily somewhat short of the full width of the holder. However, by incorporating a relatively high degree of resilience in the lips of the channel, so as to cause the card to be firmly clamped, the holder 40 can be made quite adequate for its purpose.

It is advantageous to employ contrasting colors for the board and the backing sheet so that the slits 16, 18 and 20 will be sharply delineated and thus capable of being readily located. It is recommended that the inner surface of the backing sheet be black or other dark color and the outer surface of the board be white or other light color.

A complete kit embodying the invention comprises a single board and backing sheet assembly and a set of cards and holders provided in any number deemed appropriate for the capacity of the board and the intended use of the device, say 35 to 50 in the case of a device designed for classroom use.

While a single preferred embodiment has been selected to illustrate the principles of the invention, it will be recognized that many of the details of that embodiment are capable of omission and alteration within the spirit of the invention. All such modifications of the illustrated and described device, to the extent that they embody the inventive principles defined by the more broadly worded of the appended claim, are to be deemed within the scope and purview thereof.

I claim:

A changeable chart device comprising a board having a surface sheet of generally rectangular shape providing a plurality of identical rectangular areas on its outer surface, each of said areas being defined by four unconnected perimetric slits, all of the same length and having a pair of mutually bisecting diagonal slits disposed within the area and unconnected at their ends with the perimetric slits, each slit being aligned with the corresponding slits of adjacent areas and the ends of each slit being spaced from the ends of said slits of adjacent areas by unslitted portions of said sheet whereby the integrity of the sheet is preserved, in combination with a plurality of indicia-bearing elements each comprising a display card and a holder therefor, said holder comprising an outwardly open channel portion in the bottom of which the card is seated and a prong portion extending inwardly from the channel portion in the plane of the card, the prong portion of each of said holders being inserted in selected ones of said slits and underlying said sheet in flat contact with the under surface thereof and with the channel portion thereof seated against the slitted surface of the sheet, the prong portion of each holder being substantially one-half as wide as the length of each of said perimetric slits and one side edge of the prong portion of each holder substantially coinciding with the transverse center line of the channel portion of the holder, whereby two indicia-bearing elements may be inserted in a single perimetric slit with their prong portions extending in opposite directions beneath the surface sheet and said one side edge of each substantially aligned with said one side edge of the other and with the outer edges of the cards of the two elements substantially aligned with each other.

References Cited in the file of this patent

UNITED STATES PATENTS

| | | |
|---|---|---|
| 783,293 | Liversey | Feb. 21, 1905 |
| 833,575 | Brehmer | Oct. 16, 1906 |
| 1,189,233 | Bradley | July 4, 1916 |
| 1,731,692 | Weindel | Oct. 15, 1929 |
| 2,042,760 | Baas | June 2, 1936 |
| 2,769,553 | Horton | Nov. 6, 1956 |